INVENTOR.
Henry Magnuski
BY
Norman L. Mueller
Atty.

HIGHLY SELECTIVE RADIO RECEIVER

Filed April 13, 1950 4 Sheets-Sheet 2

INVENTOR.
Henry Magnuski
BY
Foorman L. Mueller
Atty.

Aug. 26, 1952 H. MAGNUSKI 2,608,649

HIGHLY SELECTIVE RADIO RECEIVER

Filed April 13, 1950 4 Sheets-Sheet 3

INVENTOR.
Henry Magnuski

BY Norman L. Mueller

Atty.

Aug. 26, 1952 H. MAGNUSKI 2,608,649

HIGHLY SELECTIVE RADIO RECEIVER

Filed April 13, 1950 4 Sheets-Sheet 4

INVENTOR.
Henry Magnuski
By Norman L. Mueller
Atty.

Patented Aug. 26, 1952

2,608,649

UNITED STATES PATENT OFFICE 2,608,649

HIGHLY SELECTIVE RADIO RECEIVER

Henry Magnuski, Chicago, Ill., assignor to Motorola, Inc., Chicago, Ill., a corporation of Illinois Application April 13, 1950, Serial No. 155,746

6 Claims. (Cl. 250—20)

This invention relates generally to electronic receivers, and more particularly to a highly selective receiver system which permits the simultaneous use of adjacent frequency channels without interference between the signals on the adjacent channels. This application is a continuation-in-part of application, Serial No. 16,575, filed March 23, 1948, subject, Highly Selective Radio Receiver.

The increased use of radio signals for various purposes and the recent use of television and other equipment utilizing electric waves has resulted in a demand for more frequencies for the various uses than are available. This has made necessary the allocation of frequencies to the various uses by the Federal Communications Commission. However, even with such planning, the frequencies available are not adequate to meet the demands. As it is anticipated that the demands will increase, it is essential that ways and means be devised for more efficient utilization of the available frequencies.

The assignment of channels to provide efficient use of all frequencies has been restricted considerably by limitations in the equipment which has been available. In general a certain minimum band of frequencies must be transmitted to provide the desired quality of reproduction. The required bandwidth varies for different applications, with a very wide band being required for television and relatively narrow bands being adequate for certain other types of signals. However, because of limitations in the equipment, the transmissions have required frequency bands considerably wider than the bands required for good signal reproduction. This has been caused by inadequate control of the transmitted signals so that the signals are not held within the limits necessary for good reproduction and also because of the inability of the receivers to select only those signals within the particular prescribed limits.

Because of the above, it has been necessary in assigning channels to allow guard bands to separate the bands which are effectively used, with the result that the channels assigned are considerably wider than the bands required for the signals transmitted thereover. Also for certain uses, in order to prevent interference between signals transmitted simultaneously, only alternate frequency channels are assigned for use in any one area. As an example, for radio communication as used by taxicabs, only alternate channels can be used in any area and therefore only half of the channels allocated for such use may be used in any area. This is particularly bad since a relatively narrow range of frequencies has been allocated for taxicab use and the reduction of the channels to one-half provides inadequate communications.

It is clear from the above that since the effective bandwidth should not be reduced, the provision of more channels can be provided only by the reduction or elimination of the guard bands and/or by the use of all channels. It has not been possible to do this in the past without objectionable interference between the signals transmitted on the adjacent channels. Various means have been provided for better controlling the transmitters so that the signals transmitted may be held within prescribed limits and transmissions on adjacent channels do not overlap. The problem remaining is to provide receivers which effectively receive only those signals within the required limits and which reject all signals outside these limits. To provide equipment which will accomplish this result is made increasingly difficult as, in certain situations, the signals on adjacent channels, which are to be rejected by the receivers, are much stronger than the signals on the channel which is being received. This latter condition is very likely to occur in mobile communication equipment as the mobile receivers change position and may find it necessary to operate very close to a relatively powerful transmitter on an adjacent channel. The problem thus presented of receiving a relatively weak signal in the presence of a strong signal very close to the frequency of the weak signal is extremely difficult.

It is therefore an object of the present invention to provide a receiver system which permits simultaneous transmission of signals on adjacent channels without interference between the signals.

It is another object of the invention to provide a receiver system which is highly sensitive to a predetermined band of frequencies and which has sharp selectivity to strongly reject frequencies outside the predetermined band.

A further object of this invention is to provide a highly selective receiver in which the selectivity is fixed and is independent of components having changing characteristics such as vacuum tubes.

A still further object of this invention is to provide a receiver in which selectivity is provided before amplification so that strong undesired signals do not adversely affect the receiver operation.

Another object of this invention is to provide a receiver which is capable of operation on narrow channels and which is sensitive to the frequencies of a large part of the received channel.

Still another object of this invention is to provide a receiving system of the superheterodyne type in which all signals are held to low values during the frequency conversion stages so that intermodulation is not produced and tubes are not blocked by strong undesired signals.

A feature of this invention is the provision of a receiver in which a passive band pass filter is used to provide a selectivity curve which accepts a relative wide band of frequencies and has steep sides at the edges of the band, thereby strongly attenuating signals outside the band.

Another feature of this invention is the provision of an electronic wave receiver in which frequency selection is accomplished almost entirely by a single passive filter, and selectivity characteristics of which remain fixed.

Still another feature of this invention is the provision of a receiver in which sharp frequency selection is provided before the signal is amplified substantially, with the selected signal alone thereafter being amplified.

A further feature of this invention is the provision of a superheterodyne receiver in which the intermediate frequency portion thereof is made up of separate selecting and amplifying sections, with the signal being amplified in the frequency converting and selecting sections of the receiver only enough to raise the signal above noise levels, and being held at sufficiently low amplitude that tubes operate in the linear portions of their characteristics.

A still further feature of this invention is the provision of a receiver of the superheterodyne type having an overall gain of at least 100 decibels, with the frequency converting and selecting sections of the receiver providing a gain of not more than 20 decibels and the amplication after selection providing a gain of at least 60 decibels.

Further objects and features and many advantages of the invention will be apparent from a consideration of the following description taken in connection with the accompanying drawings in which.

In practicing the invention there is provided a superheterodyne wave signal receiver which may be of any type as, for example, for frequency modulation or amplitude modulation radio reception, or for television reception. The receiver includes a frequency conversion section in which the received carrier wave is reduced in frequency to an intermediate frequency wave, the frequency of which is usually not more than ten times the frequency band of the channel to be received. One or two stages of frequency conversion may be required depending upon the frequencies involved. The amplification of the received signal in the converting stages is held down so that the received signals, both desired and undesired, are not of sufficient amplitude to block the tubes and thereby desensitize the receiver. By holding the signal at this level the tubes operate on their linear characteristic and objectionable intermodulation is not produced. After the received signal has been converted to a signal of lower frequency, the desired frequency band is selected by a very sharp band pass filter. The filter has very sharp sides and is designed to attenuate signals outside the band by about 100 decibels below that of the signals at the center frequency of the filter. The frequency band selected by the filter is applied to a high gain amplifier, which may or may not be tuned. Although additional tuning is not required for selectivity and may even be objectionable, it may be more practical to provide tuned stages in certain applications because of the increased gain and stability resulting therefrom. The modulating signal or signals are then derived from the amplified intermediate frequency signal and are reproduced in a manner depending on the type of receiver involved.

Figure 1:
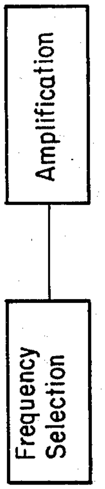
Figs. 1 and 2 are block diagrams illustrating the improved system in accordance with the invention.

The fundamental feature of the receiver system in accordance with the invention is the provision of a system in which the selectivity is provided almost entirely by a single passive band pass filter. The selectivity is thereby separate from the amplification and is provided before the greater percent of the amplification in the receiver system. In prior systems it has been usual to provide an intermediate frequency amplifier having tuned stages which both amplify and select. Such intermediate frequency amplifier design is limited by the fact that the amplification of each stage must be held to the selectivity of the stage with respect to undesired signals in order to prevent desensitizing and intermodulation. For adjacent channel operation strong undesired signals are present very close to the band being accepted and the selectivity with respect to these undesired signals is very low. Therefore, the amplification per stage must be held low and to provide high gain it is necessary to provide a large number of stages and the resulting structure becomes very expensive. Further, such stages are relatively critical requiring very careful adjustment and frequent maintenance. Fig. 1 in the drawings is a simple block diagram illustrating the fundamental feature that selection is provided in a single unit which is separated from amplification, and further that the frequency selection is provided in the system ahead of the amplification.

Figure 2:
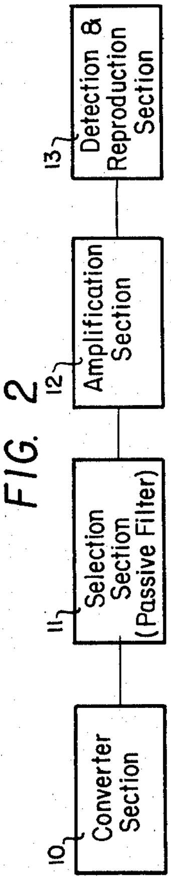

Fig. 2 illustrates a complete receiver including a frequency converter section 10, a selection section 11 which consists of a sharp band pass passive filter, an amplification section 12 and a detection and reproduction section 13. This is a superheterodyne receiving system in which the carrier wave is reduced to an intermediate frequency wave by a converter 10, with the intermediate frequency wave being processed in two separate sections, the frequency selection section or band pass filter, and the amplification section. The amplified intermediate frequency signal is then detected and reproduced in any desired manner. Receiver circuits made up of these four sections may be used for various applications such as for amplitude modulated or frequency modulated sound receivers and for television receivers which reproduce both sound and images. The specific construction of various receivers will be described hereinafter.

It is to be pointed out that the frequency converter section of a receiver in accordance with the invention may be of various well known constructions and may include one or more frequency converting stages. The frequency converter must have sufficient selectivity to provide image rejection and must have sufficient amplification to keep the desired signal at a level above the noise level. However, the frequency converter does not need to include precise frequency selectivity and requires very little amplification so that the circuit may be relatively simple and inexpensive.

The frequency selection section or passive band pass filter of the receiver may be of various constructions. Electrical filters made up of constant-K and M-derived sections may be used. Extremely precise selection may be obtained by such a filter because the band pass covers a frequency range which is of the order of 10% or more of the frequency being selected. It is to be pointed out that electromechanical filters may also be used to provide the selection, with the electromechanical filter covered in application Serial No. 65,253, filed December 14, 1948, being suitable, for example. Since the receiver selectivity characteristics are controlled almost entirely by the filter, it may be desired to provide the filter as a plug-in unit so that by changing the filter, the selectivity characteristics of the filter may be changed. Alternatively, the filter characteristics may be changed by providing a unit in which various filter sections may be switched in or out. The design of such filter sections is known in the art.

The amplifier section of the receiver may be of various constructions which provides high gain and a wide band. As previously stated, further selectivity is not required and may be objectionable. Accordingly the amplifier may be a resistance coupled amplifier or may be an amplifier with tuned stages in order to provide increased gain and stability. The detection and reproduction section will depend entirely upon the type of receiver involved and no new technique is proposed with reference to these components. In an amplitude modulation sound receiver, a simple diode detector can be provided followed by amplifier stages and a loudspeaker. In a frequency modulation receiver, limiters and discriminators may be provided followed by the audio amplifier and loudspeaker. A television receiver requires more complicated detecting and utilization components since two separate carrier waves are provided and it is necessary to derive the video signal which is amplitude modulated and the sound signal which is frequency modulated therefrom. Audio amplifying and reproducing means is required for the sound signals and a picture tube with suitable scanning and high voltage system is required for reproducing the image.

Figure 4:
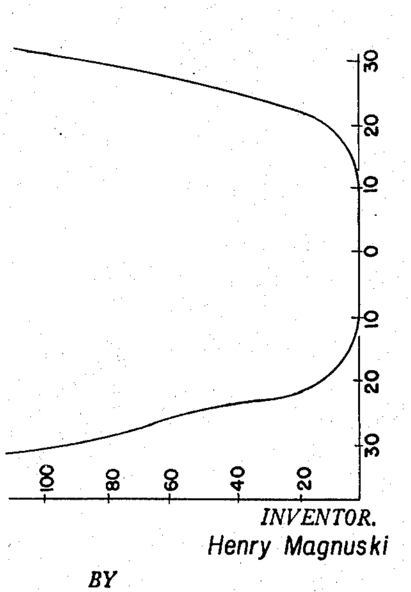
Fig. 4 illustrates the frequency characteristics of the receiver of Fig. 3.
Figure 3:
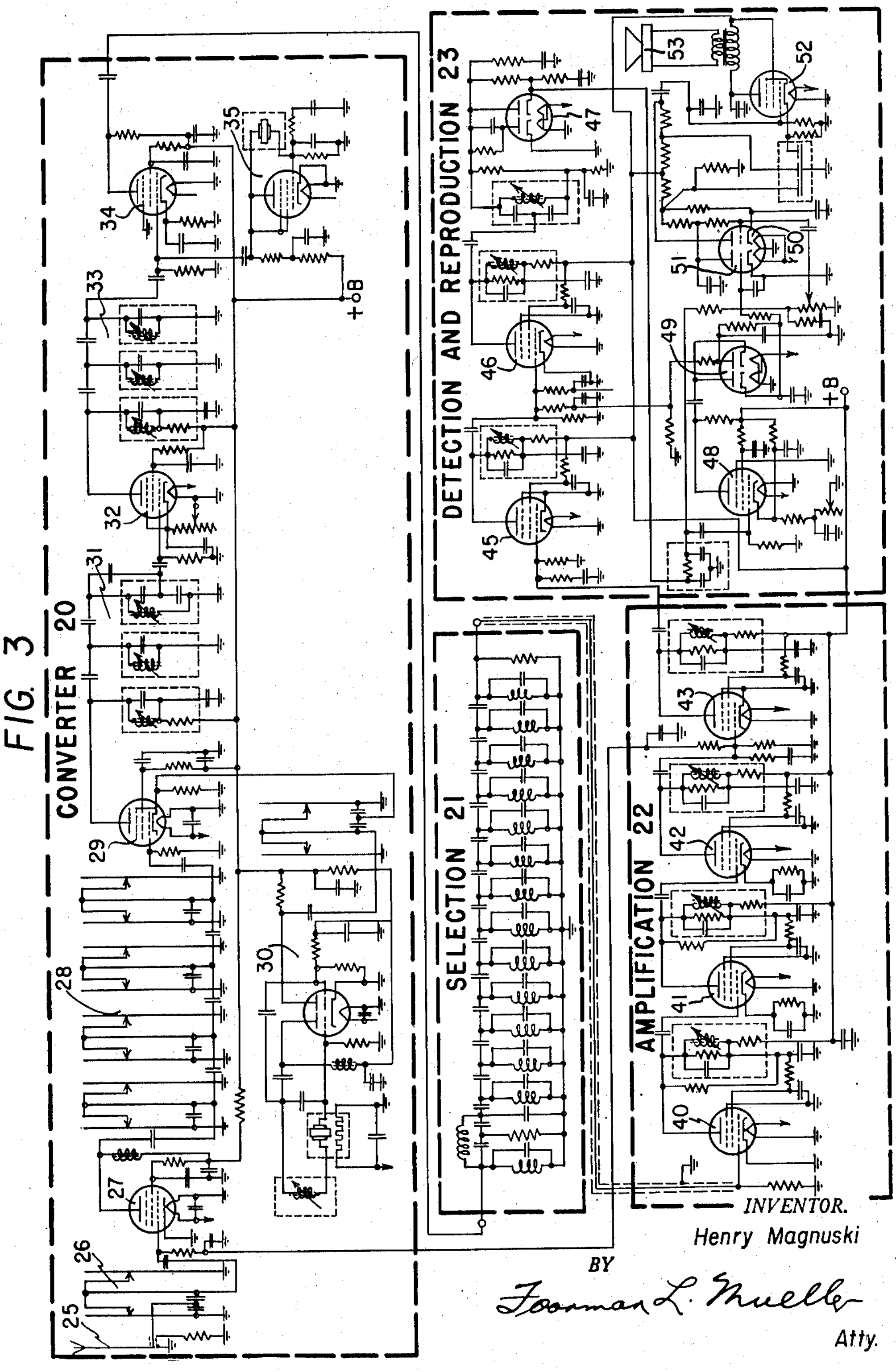
Fig. 3 is a circuit diagram of superheterodyne frequency modulation radio receiver in accordance with the invention.

Referring now to Fig. 3, this figure shows the complete circuit diagram of a frequency modulation radio receiver such as may be used for communication purposes. The particular circuit shown is designed for use in the 160 megacycle band and for operation on a 60 kilocycle channel. The response curve of the receiver is shown in Fig. 4. The receiver is made up of the four sections as shown by the block diagram in Fig. 2, with each section being shown in dotted lines. The converter section is designated 20, the selection section is designated 21, the amplification section is designated 22 and the detection and reproduction section is designated at 23.

The converter section 20 includes an antenna 25 which applies the received signal to a tuned circuit 26. A single radio frequency amplifier stage 27 is provided for raising the signal level of the received signal. The output of the radio frequency amplifier stage includes a plurality of tuned circuits 28 through which the signal is applied to the mixer 29. An oscillator system 30 is provided including a double triode tube with one section being utilized in an oscillator circuit and the other in a frequency multiplying circuit. The oscillator system 30 provides local osillations for the mixer 29 so that the output of the mixer is a signal of reduced frequency. This signal is selected in the tuned circuit 31 and is amplified in the single stage 32. The amplified signal is further selected in the tuned circuit 33 and applied to the second mixer 34. A second oscillator system 35 provides local oscillations for the mixer 34 for further reducing the frequency of the signal to provide the intermediate frequency. It is to be pointed out that the stages in the converter must have the selectivity required to reject the image frequency. This is provided more effectively by the use of two converter stages. The amplification of the converter is held to a low value so that the signals applied to the grids of the tubes 27, 29, 32 and 34 are of such value that the tubes will operate over the linear portion of the characteristics thereof, and that neither the desired nor the undesired signals will desensitize the stages. The signal values which can be tolerated depend upon the characteristics of the tubes used. It has been found that the gain of the converter section should be held below 20 decibels. The converter reduces the frequency of the 160 megacycle received wave to an intermediate frequeny of around 455 kilocycles.

As previously stated the selection of the received wave is accomplished principally in the selection section 21. This section is illustrated as a band pass electrical filter made up of constant-K and M-derived sections. As previously stated the receiver is designed for operation on signals transmitted over channels 60 kilocycles wide. As shown in Fig. 4 the selectivity is such that the frequencies at the edges of the channel are attenuated 100 decibels and a band-width of 40 kilocycles is provided between the points which are down 10 decibels. The filter therefore provides a band greater than half the entire channel which is not substantially attenuated, and at the same time attenuates the frequency at the edges of the channel by 100 decibels. As previously stated such sharp selectivity is more easily obtained because the intermediate frequency is relatively low and the band pass is relatively large compared with the frequency being used. As stated above, the frequency of the intermediate frequency wave should generally be not more than 10 times the width of the channel being received. However, satisfactory operation may be obtained by using intermediate frequencies outside this range.

The amplification section 22 includes three stages of amplification each of which includes one of the tubes 40, 41, 42 and 43. Each stage provides high gain so that the overall gain of the amplifier is more than 80 decibels and may be as high as 100 decibels. The coupling between stages is provided by tuned circuits to provide the high gain and stability desired in the amplifier. Since careful selectivity is not required in the amplifier the construction may be inexpensive and resistance coupled stages could be used.

The output from the amplification section 22 is applied to the detection and reproduction section 23 which includes limiters 45 and 46, a discriminator including the two diode sections provided in the tube 47, noise amplifier 48, noise rectifier 49, first audio amplifier section 50 which is included in the same envelope as the squelch control section 51, output audio amplifier 52, and reproducer 53. The operation of these various stages is well known to those skilled in the art and accordingly will not be described in detail herein. Various known circuit arrangements other than the arrangement disclosed may, of course, be used with the circuit which is best depending upon the particular application to which the receiver is to be put.

Figure 5:
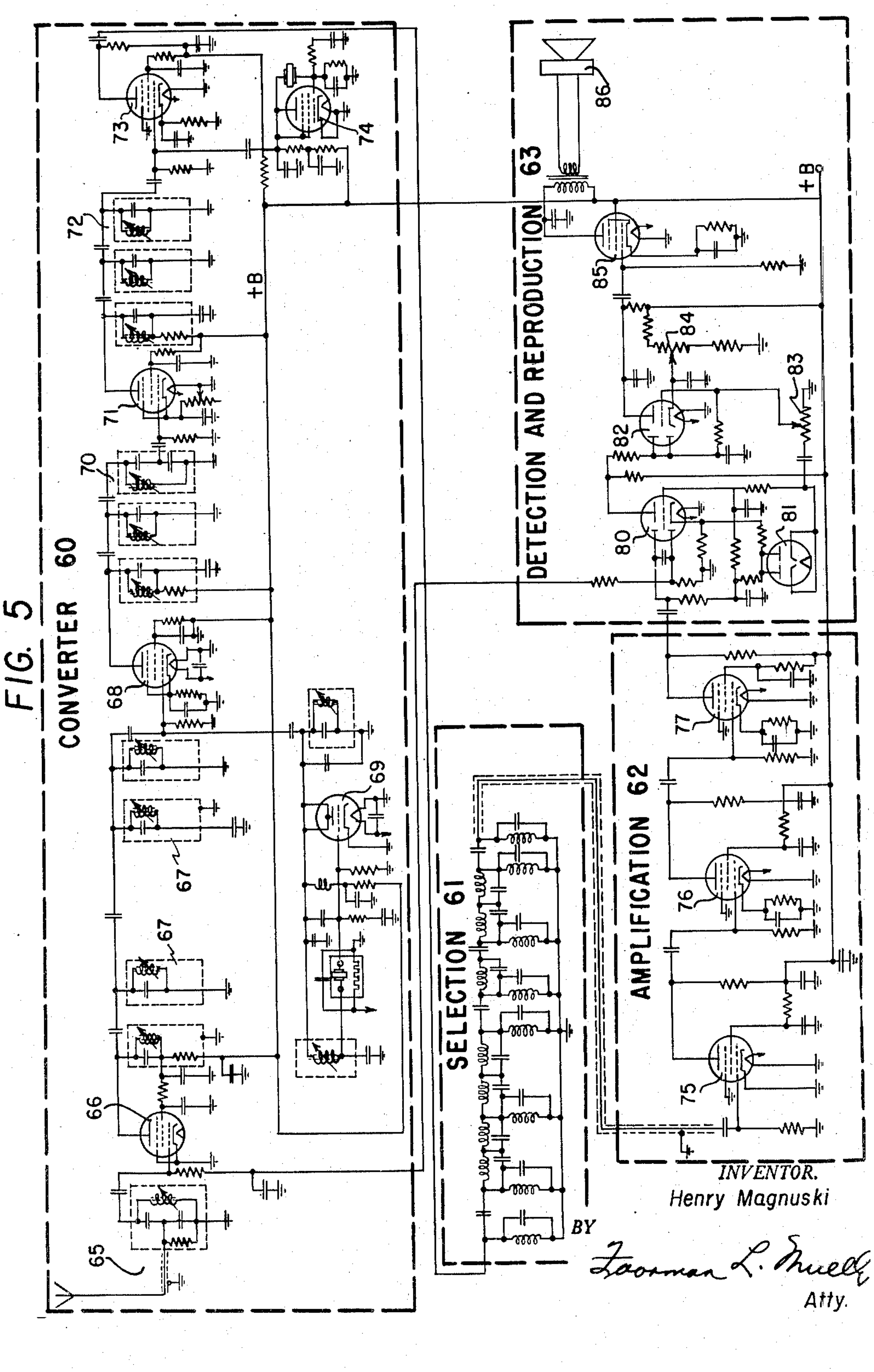
Fig. 5 is the circuit diagram of a superheterodyne amplitude modulation radio receiver in accordance with the invention.

In Fig. 5 there is illustrated a circuit diagram of an amplitude modulation receiver in accordance with the invention. The circuit shown is for a receiver operating in the range from 25 to 50 megacycles on channels 30 kilocycles wide. The receiver includes a converter section 60, a selection section 61, an amplification section 62 and a detection and reproduction section 63. The converter section may be generally similar to that of the frequency modulation receiver of Fig. 3 but is designed to operate in a different frequency range. The section includes an antenna system 65 which applies signals to a radio frequency amplifier 66. The amplifier includes a tuned output circuit 67 which selects the received signals and applies the same to the mixer tube 68. Local oscillations are provided for the mixer by the oscillator 69 which may be crystal controlled. The reduced frequency from the mixer 68 is applied through tuned circuit 70 to amplifier 71, with the amplified signal being further selected in tuned circuit 72 and applied to the second mixer 73. Local oscillations are provided to the second mixer from the oscillator 74. In the systems shown, the converter 60 reduces the received signals to intermediate frequency signals having a center frequency of 155 kilocycles.

Figure 6:
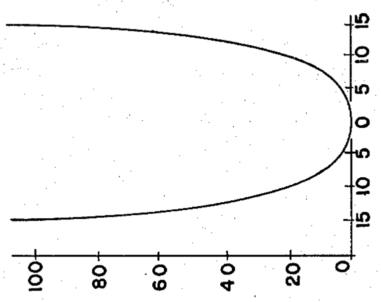
Fig. 6 is a curve showing the frequency characteristics of the receiver of Fig. 5.

As in the previously described systems, the intermediate frequency signal is sharply selected in the selection section which is designated 61. This section is illustrated as an electrical band pass filter made up of constant-K and M-derived sections. As shown in Fig. 6 the filter is designed for use on channels 30 kilocycles wide, with the signals at the edges of the channel being attenuated 100 decibels. The nose of the curve is relatively flat so that a band of about 20 kilocycles is passed with an attenuation of only 10 decibels. The band pass of the filter extends over a range of about 20% of the operating frequency and this makes the design of a filter having very sharp selectivity much easier.

The amplification section 62 includes three stages identified 75, 76 and 77. These stages provide a high overall gain, with the gain of the three stages being preferably of the order of 80 decibels or more. Because of the low intermediate frequency, resistance coupled stages will provide high gain and accordingly such stages may be used to keep the cost of the receiver low. This is particularly true since the signal has been sharply selected in the selection section 61 and further selectivity is not required.

The detection and reproduction section may be of any standard design suitable for use with amplitude modulation signals. The system shown includes tube 80 which includes a diode section acting as the second detector and a second diode section providing an automatic gain control voltage. The tube also includes a triode section which forms a part of a squelch circuit. A tube 81 is provided including a pair of diodes connected in parallel as a series noise limiter. The tube 82 includes diode sections connected in parallel in the squelch circuit and a triode forming the first audio frequency amplifier. The grid of this triode is connected to variable resistor 83 which is the volume control, and the cathode thereof is connected to variable resistor 84 which provides squelch control. The output of the triode section is applied to output stage 85 which is the final amplifier stage and provides current for the reproducing device 86.

Figure 8:
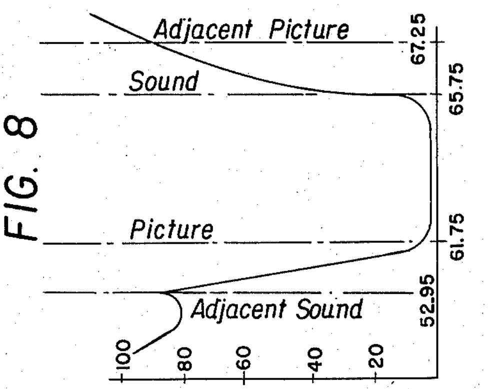
Fig. 8 illustrates the frequency characteristics of the television receiver of Fig. 7.
Figure 7:
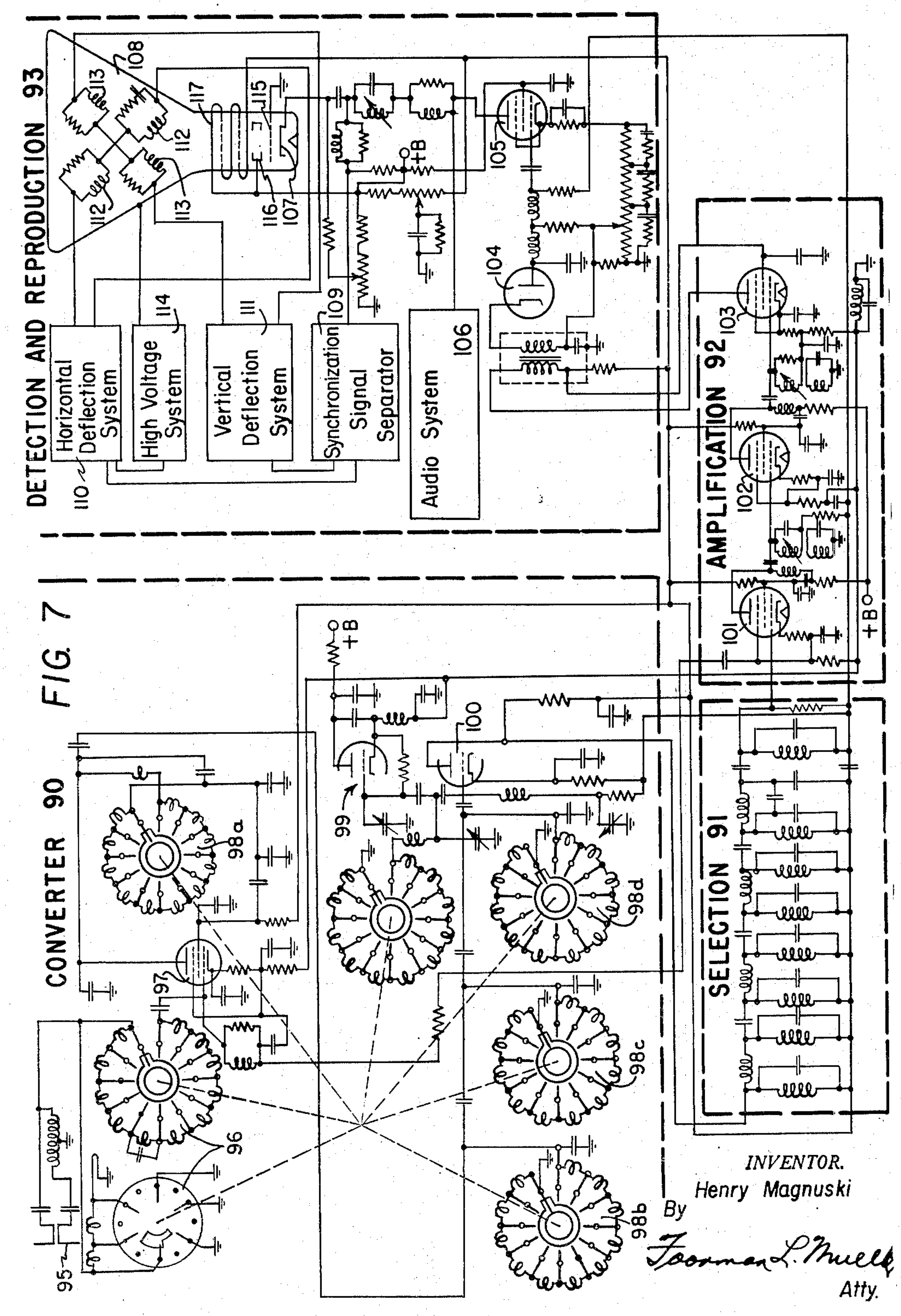
Fig. 7 is a circuit diagram of a television receiver with certain components thereof shown in block diagram form.

Referring now to Figs. 7 and 8, in these figures there is shown the circuit and response curve of a television receiver constructed in accordance with the invention. The television receiver has the same four sections as shown in Fig. 2 with the converter section being designated 90, the selection section being designated 91, the amplifier section being designated 92, and the detection and reproduction section being designated 93. The converter section includes an antenna 95 which may be of the dipole type which is connected to tuning means designated 96. The antenna output is applied to radio frequency amplifier 97 which is coupled to a tuning system including the elements 98*a*, 98*b*, 98*c* and 98*d*. An oscillator 99 is provided, with the signals from the oscillator and the radio frequency amplifier being applied to mixer 100. A single stage of conversion is provided with sufficient tuning to provide image rejection and with only the amplification necessary to hold the signal above the noise level. The circuit illustrated is designed for use in the present television bands with the channels being 6 megacycles wide and extending in the frequency range from 54 to 216 megacycles. The converter provides an intermediate frequency of 14.2 megacycles.

The selection section 91 includes a band pass filter generally similar to the filter in the amplitude and frequency modulated receivers. This filter is designed to operate at the 14.2 megacycle frequency and to provide a bandwidth of 6 megacycles. It will be noted from Fig. 8 that a bandwidth of about 4½ megacycles is provided at the 10 decibel points and that attenuation of approximately 100 decibels is provided at the frequencies of the carriers of the adjacent channels. Considering that the sound carrier of the desired channel is at 65.75 megacycles and the picture carrier is at 61.25 megacycles, the sound carrier of the lower adjacent channel would be at 59.75 megacycles and would be attenuated by about 90 decibels. The picture carrier of the higher adjacent channel would be at 67.25 megacycles and would be attenuated between 90 and 100 decibels. This selectivity would be sufficient to permit the operation of television receivers on adjacent channels in the same locality without interference from the signals on the adjacent channels. It is to be noted that the frequency at which the filter operates is related to the band pass of the filter in substantially the same manner as in the filters of the frequency modulation and amplitude modulation receivers.

The amplification section 92 of the receiver includes the tubes 101, 102 and 103 which provide three stages of amplification. These stages may provide very high gain, with the overall gain being about 80 decibels. The amplification section must preserve the wide band which includes both the picture and sound carriers in order to provide high quality television reproduction.

The amplified composite signal is applied from the amplification section 92 to the detection and reproduction section 93 which includes the diode 104 serving as the video detector and as a converter for heterodyning the video and sound carriers to provide a 4.5 megacycle carrier on which the sound wave is frequency modulated. The video signal and the modulated sound carrier are amplified in the video amplifier 105 from which the sound signal is applied to the audio system 106. The audio system may include a frequency modulation limiter and discriminator, an audio amplifier, and a reproducing device. The audio system is shown in block diagram as various well known circuit and structural arrangements may be used.

The video signal is also applied from the video amplifier 105 to the cathode 107 of the cathode ray tube 108 and to the synchronization signal separator 109. The horizontal and vertical synchronization signals are separated and applied to the horizontal deflection system 110 and the vertical deflection system 111 respectively. These systems provide current for the deflecting coils 112 and 113 positioned about the cathode ray tube. A high voltage system 114 is also provided which may be combined with the horizontal deflection system 110 and provide potential for the anode of the cathode ray tube. The control grid 115 of the tube may be grounded and $B^+$ potential may be applied to the second grid 116 and to the focus coil 117 as illustrated.

It is seen from the above that the receiver system in accordance with the invention is adaptable to receivers of various types. As previously stated the construction of each of the four sections may be in accordance with various circuit designs, with the improved result following from the teachings presented herein. Summarizing these teachings, received signals are converted to a lower frequency without substantial amplification to prevent intermodulation and desensitizing of the stages. The intermediate frequency to which the signal is reduced depends on the bandwidth of the signal being received, and should generally be not more than 10 times the width of the channel being received. The signal is then selected in a single sharply tuned passive filter. The band pass of the filter can have very sharp sides because of the frequency relation between the band pass and the operating frequency. The amplifier section can be of relatively simple design inasmuch as the signal has been sharply selected and further selection is not required. Amplifier stages having high gain should be provided as the signal has been selected at very low level. The amplified signal can then be handled in the usual way by detection and utilization circuits properly designed for the type of signal being received.

The new receiving system in accordance with the invention permits the simplification of highly selective receivers. The selectivity can be effectively controlled entirely by the selection section so that there is practically no limit to the selectivity which can be obtained. As previously stated, the overall receiver characteristics can be changed merely by changing the filter, or modifying the characteristics thereof. Since the filter is a passive unit the characteristics thereof will be fixed and will not be subject to changing characteristics of components such as tubes. Each of the filter sections, as shown at 21 in Fig. 3, at 61 in Fig. 5, and at 91 in Fig. 7, have a plurality of sections with the end sections being connected to the converter section and the amplification section of the receiver respectively. As is pointed out above, the filter is passive and the frequency characteristics thereof are not subject to the changing characteristics of the other components, and consequently the frequency characteristics of the intermediate sections of the filter are substantially independent of the converter section and the amplification section. Very narrow band pass characteristics with very sharp selection at the edges of the bands can be provided by this system without substantially increasing the complexity thereof. To follow conventional receiver design, with selectivity and gain being distributed throughout the stages, prevents such sharp selectivity and requires very carefully tuned stages which are very expensive to construct and must be very carefully maintained.

Receivers have been constructed in accordance with the invention and have been found to be highly satisfactory in use. Frequency modulation receivers for use in the 160 megacycle range have operated satisfactory on adjacent 60 kilocycle channels and have provided a usable bandwidth of approximately 40 kilocycles. Such receivers have been highly effective in rejecting strong signals on channels adjacent to the received channel and therefore fill this need in mobile equipment. These receivers have also been very sensitive to weak signals and have not produced objectionable responses due to intermodulation.

Although certain embodiments of the invention have been described which are illustrative thereof, it will be obvious to those skilled in the art that the novel receiving system disclosed can be utilized in various other forms, and the scope of the invention is to be limited only by the appended claims.

I claim:

1. An electromagnetic wave receiver for receiving modulated carrier waves, and which receiver is capable of receiving waves in a predetermined channel having an amplitude just above the noise level of the receiver, in the presence of waves in adjacent channels of greater amplitude than that of the waves in the predetermined channel, said receiver including the combination, frequency changing means for reducing the frequency of the received waves, a single filter unit for selecting waves in a frequency band corresponding to the predetermined channel and for substantially attenuating the amplitude of all waves at frequencies outside said frequency band, and amplifier means coupled to said filter unit for amplifying said selected waves, said filter unit being of the fixed passive band-pass type including a pair of end sections and a plurality of sections intermediate said end sections, said end sections being connected to said frequency changing means and said amplifying means respectively and said intermediate sections being substantially independent of the characteristic of said frequency changing means and said amplifier means, whereby the selectivity characteristics of said filter and the selectivity characteristics of said receiver are substantially independent of the other components of said receiver, said filter unit providing substantially all of the selectivity of the entire receiver with respect to waves in channels adjacent the predetermined channel and thereby controlling the selectivity characteristics of said receiver.

2. An electromagnetic wave receiver in accordance with claim 1 which is adapted to receive frequency modulated carrier waves, and which includes frequency detecting means coupled to said amplifier means for deriving the frequency modulation from said amplified waves, and reproducing means coupled to said detecting means for reproducing the detected modulation.

3. An electromagnetic wave receiver in accordance with claim 1 which is adapted to receive amplitude modulated carrier waves, and which includes amplitude detecting means coupled to said amplifier means for deriving the amplitude modulation from said amplified wave, and reproducing means coupled to said detecting means for reproducing the detected modulation.

4. An electromagnetic wave receiver in accordance with claim 1 which is adapted to receive television signals including a video modulated carrier wave and an audio modulated carrier wave, and which includes detector means coupled to said amplifier means for deriving the video modulation and the audio modulation from said amplified waves, and reproducing means coupled to said detector means for reproducing said video and audio signals.

5. An electromagnetic wave receiver having an antenna for receiving modulated carrier waves in a range of frequencies, and which receiver is capable of receiving waves in a predetermined channel having an amplitude just above the noise level of the receiver, in the presence of waves in adjacent channels of greater amplitude than that of the waves in the predetermined channel, said receiver including in combination, frequency changing means for reducing the frequency of the received waves and for providing broad selectivity with respect to frequencies differing substantially from said predetermined channel, a single replaceable band-pass filter unit for selecting signals in a frequency band corresponding to the predetermined channel and for substantially attenuating the amplitude of all signals at frequencies outside said frequency band, and amplifier means coupled to said filter unit for amplifying said selected signals, said amplifier means having substantially no effect on the overall frequency characteristics of the receiver, said filter unit being of the fixed passive band-pass type including a pair of end sections and a plurality of sections intermediate said end sections, said end sections being connected to said frequency changing means and said amplifier means respectively and said intermediate sections being substantially independent of the characteristics of said means, whereby the selectivity characteristics of said filter and the corresponding selectivity characteristics of said receiver are substantially independent of the other components of said receiver, said filter unit providing substantially all of the selectivity of the entire receiver with respect to waves in channels adjacent to the predetermined channel and thereby controlling the selectivity characteristics of said receiver so that the selectivity characteristics of the receiver may be changed by replacement of said filter unit with a filter unit having the desired selectivity characteristics, said replacement of said filter unit being accomplished without adjustment of the other components of the receiver.

6. An electromagnetic wave receiver for receiving modulated carrier waves, and which receiver is capable of receiving waves in a predetermined channel having an amplitude just above the noise level of the receiver, in the presence of waves in adjacent channels of greater amplitude than that of the adjacent channels of greater amplitude than that of the waves in the predetermined channel, said receiver including in combination, frequency changing means for reducing the frequency of the received waves, said frequency changing means providing broad selectivity with respect to frequencies differing substantially from the frequencies of said predetermined channel and holding the amplitude of the waves therein just above the noise level of said means, a single replaceable filter unit for selecting signals in a frequency band corresponding to the predetermined channel and for substantially attenuating the amplitude of all signals at frequencies outside said frequency band, and amplifier means coupled to said filter unit for amplifying said selected signals, said amplifier means having substantially no effect on the selectivity characteristics of said receiver, said filter unit being of the fixed passive band-pass type including a pair of end sections and a plurality of sections intermediate said end sections, said end sections being connected to said frequency changing means and said amplifying means respectively and said intermediate sections being substantially independent of the characteristics of said means, whereby the selectivity characteristics of said filter and the corresponding selectivity characteristics of the receiver are substantially independent of the other components of the receiver, said filter unit providing substantially all of the selectivity of the entire receiver with respect to waves in channels adjacent the predetermined channel so that the selectivity characteristics of the receiver may be changed by replacement of the filter unit with a filter having different characteristics.

HENRY MAGNUSKI.

REFERENCES CITED

The following references are of record in the file of this patent:

UNITED STATES PATENTS

| Number | Name | Date |
|---|---|---|
| 1,746,305 | Espenschied | Feb. 11, 1930 |
| 1,762,945 | Anderson | June 10, 1930 |
| 1,850,973 | Vreeland | Mar. 22, 1932 |
| 2,032,675 | Waller | Mar. 3, 1936 |
| 2,186,980 | Lowell | Jan. 16, 1940 |
| 2,263,634 | Landon | Mar. 30, 1940 |
| 2,272,075 | Vreeland | Feb. 3, 1942 |
| 2,327,866 | Budenbom | Aug. 24, 1943 |